(12) United States Patent
Knowles et al.

(10) Patent No.: US 12,247,577 B2
(45) Date of Patent: *Mar. 11, 2025

(54) SYSTEM AND METHOD FOR HANDLING DIGITAL CONTENT GOVERNANCE IN AN ORGANIZATION

(71) Applicant: Hyland UK Operations Limited, Maidenhead (GB)

(72) Inventors: John Knowles, Slough (GB); John Iball, Bicester (GB); Ovidiu Benea, Isai (RO); Stefania Ropotica, Isai (RO)

(73) Assignee: Hyland UK Operations Limited, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,908

(22) Filed: May 5, 2023

(65) Prior Publication Data

US 2023/0358250 A1 Nov. 9, 2023

Related U.S. Application Data

(63) Continuation of application No. 17/744,505, filed on May 13, 2022, now Pat. No. 11,674,525, which is a
(Continued)

(51) Int. Cl.
*G06F 21/10* (2013.01)
*F04D 29/38* (2006.01)
(Continued)

(52) U.S. Cl.
CPC ......... *F04D 29/382* (2013.01); *F04D 29/388* (2013.01); *G06F 16/353* (2019.01);
(Continued)

(58) Field of Classification Search
None
See application file for complete search history.

(56) References Cited

U.S. PATENT DOCUMENTS 8,554,772 B2 10/2013 Ayars et al.
8,583,651 B2 11/2013 Ayars et al.
(Continued)

OTHER PUBLICATIONS

Muthitacharoen, Athicha, Benjie Chen, and David Mazieres. "A low-bandwidth network file system." In Proceedings of the eighteenth ACM symposium on Operating systems principles, pp. 174-187. 2001 (Year: 2001).*
(Continued)

*Primary Examiner* — Uyen T Le
(74) *Attorney, Agent, or Firm* — Eschweiler & Potashnik, LLC

(57) ABSTRACT

Products, systems and methods for removing a first item from a client computing system, in response to detecting the first item is declared as belonging to a first class in a database; preventing editing of a second item by the client computing system, in response to detecting the second item is declared as belonging to a second class in the database, a record declared as belonging to the first class or the second class by an application executed on the client computing system, the client computing system remotely connected, via a communications network, to a content management system associated with the database; and queuing a third item for transfer to the client computing system over the communications network, in response to detecting a synchronization event initiated by the client computing system or a server computing system connected to the client computing system over the communications network.

20 Claims, 3 Drawing Sheets

Related U.S. Application Data continuation of application No. 16/121,404, filed on Sep. 4, 2018, now Pat. No. 11,353,039.

(51) Int. Cl.
  *G06F 16/35* (2019.01)
  *G06F 16/353* (2025.01)
  *G06F 16/93* (2019.01)
  *G06Q 50/18* (2012.01)

(52) U.S. Cl.
  CPC .............. *G06F 16/93* (2019.01); *G06F 21/10* (2013.01); *F05D 2240/303* (2013.01); *F05D 2240/304* (2013.01); *G06Q 50/184* (2013.01); *H04L 2209/60* (2013.01)

(56) References Cited

U.S. PATENT DOCUMENTS

| | | | |
|---|---|---|---|
| 9,203,862 B1 | 12/2015 | Kashyap et al. | |
| 9,703,974 B1* | 7/2017 | Surkatty | H04L 63/20 |
| 10,257,109 B2 | 4/2019 | Velasco | |
| 2004/0243819 A1* | 12/2004 | Bourne | G06F 21/10 |
| | | | 713/193 |
| 2008/0060051 A1* | 3/2008 | Lim | G06F 16/93 |
| | | | 726/1 |
| 2010/0186091 A1 | 7/2010 | Turner et al. | |
| 2011/0218995 A1 | 9/2011 | Ayars et al. | |
| 2012/0191711 A1 | 7/2012 | Ayars et al. | |
| 2015/0278323 A1 | 10/2015 | Melahn et al. | |
| 2015/0324606 A1* | 11/2015 | Grondin | G06F 3/0482 |
| | | | 726/1 |
| 2016/0110370 A1 | 4/2016 | Wetherall et al. | |
| 2016/0357978 A1* | 12/2016 | Lin | G06F 21/6272 |
| 2017/0124302 A1* | 5/2017 | Baldwin | G06F 21/105 |
| 2017/0364698 A1 | 12/2017 | Goldfarb et al. | |
| 2019/0379642 A1* | 12/2019 | Simons | H04L 63/0281 |
| 2021/0342836 A1* | 11/2021 | Cella | H04L 9/3239 |
| 2022/0150280 A1* | 5/2022 | Azulay | H04L 63/0428 |
| 2022/0179986 A1* | 6/2022 | Veeramachaneni | G06F 3/0637 |
| 2023/0185769 A1* | 6/2023 | Lichtenberg | G06F 16/168 |
| | | | 707/821 |

OTHER PUBLICATIONS

Uchibeke et al. "Blockchain access control ecosystem for big data security." 2018 IEEE International Conference on Internet of Things (iThings), IEEE Green Computing and Communications (GreenCom), IEEE Cyber, Physical and Social Computing (CPSCom), IEEE Smart Data (SmartData) Jul. 2018 IEEE 6 pages. (Year: 2018).*

\* cited by examiner

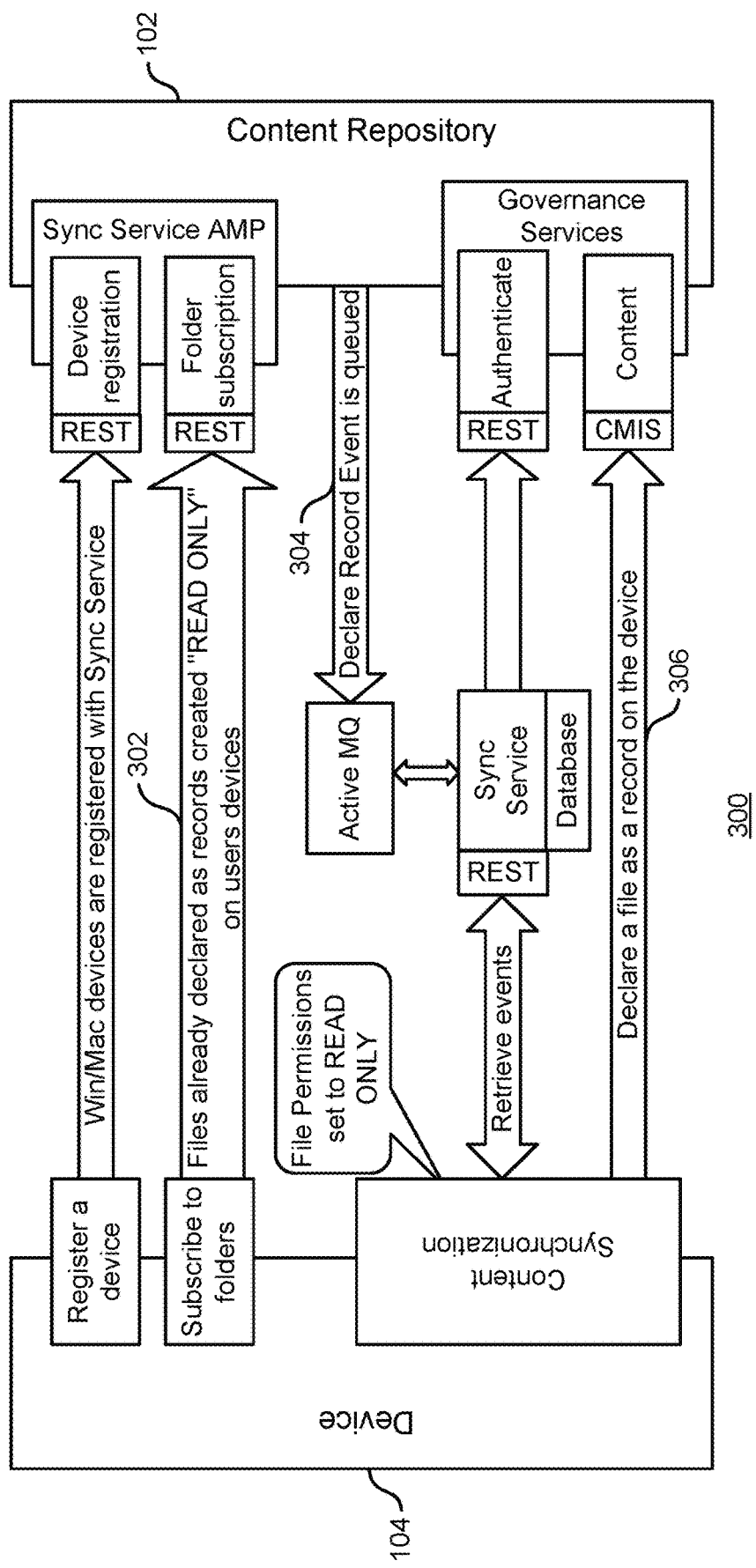

SYSTEM AND METHOD FOR HANDLING DIGITAL CONTENT GOVERNANCE IN AN ORGANIZATION

CROSS REFERENCE TO RELATED APPLICATIONS

This application is a continuation of and claims priority to the earlier filing date of U.S. patent application Ser. No. 17/744,505, filed May 13, 2022, which is a continuation of and claims priority to the earlier filing date of U.S. patent application Ser. No. 16/121,404, filed Sep. 4, 2018, the contents of which are incorporated by reference herein in entirety.

TECHNICAL FIELD

The subject matter described herein relates to content management systems and methods, and more particularly to a record and classified file management system and method for handling content governance throughout an organization.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content items that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. An "enterprise" can generally refer to an organization, such as for example a business or company, a governmental entity, a foundation, a university, or the like, and can have content requirements related to one or more business processes, content uses, etc.

End users, often government personnel, will create content on their client computing system, such as a desktop or laptop computer, which is to be declared as a permanent record and/or classified due to the sensitive nature of its contents.

Electronic ECM with records and classified files is typically done on a remote server, which users have to login to remotely to perform specific actions like declaring a file as a record, and classifying a file, etc. Records management and classification is normally done via a server-based application therefore requiring users to adhere to manual processes and procedures to move sensitive materials from their computers to the remote server.

SUMMARY

This document describes a system and method, implemented as a native or downloadable desktop application, which allows content to be treated appropriately when users have synchronized files from a centralized, controlled content management system to their desktops. The system and method provides content governance record declaration and classification capabilities from within the native operating systems of users' computers, namely Windows® and Mac OS X®.

In some aspects of the system and method disclosed herein is the removal of files from users' computers when they are classified, and preventing editing of files that have been declared as permanent records.

In one aspect, a user is able to work with files locally, on their desktop using the downloadable application, for instance, while each file is automatically synchronized to the electronic content management system, and treated automatically during specific points in the lifecycle of the content.

In some aspects, a system, method and computer program product include a computer-implemented process for records management and classification of files in a content management system having a server system that stores the files. The method includes steps of detecting, by an application, when at least one of the files is classified by a user as a classified file, and based on the detecting of the classification of the one or more files, removing, by the application, each classified file from the client computing system. The process further includes detecting, by the application, when at least one of the files is declared as a permanent record by the user, and based on the detecting of the declaration as a permanent record, preventing, by the application, editing by the client computing system of each file declared as a permanent record.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates the desktop synchronization process when files are declared as records;

When practical, similar reference numbers denote similar structures, features, or elements.

DETAILED DESCRIPTION

Figure 1:
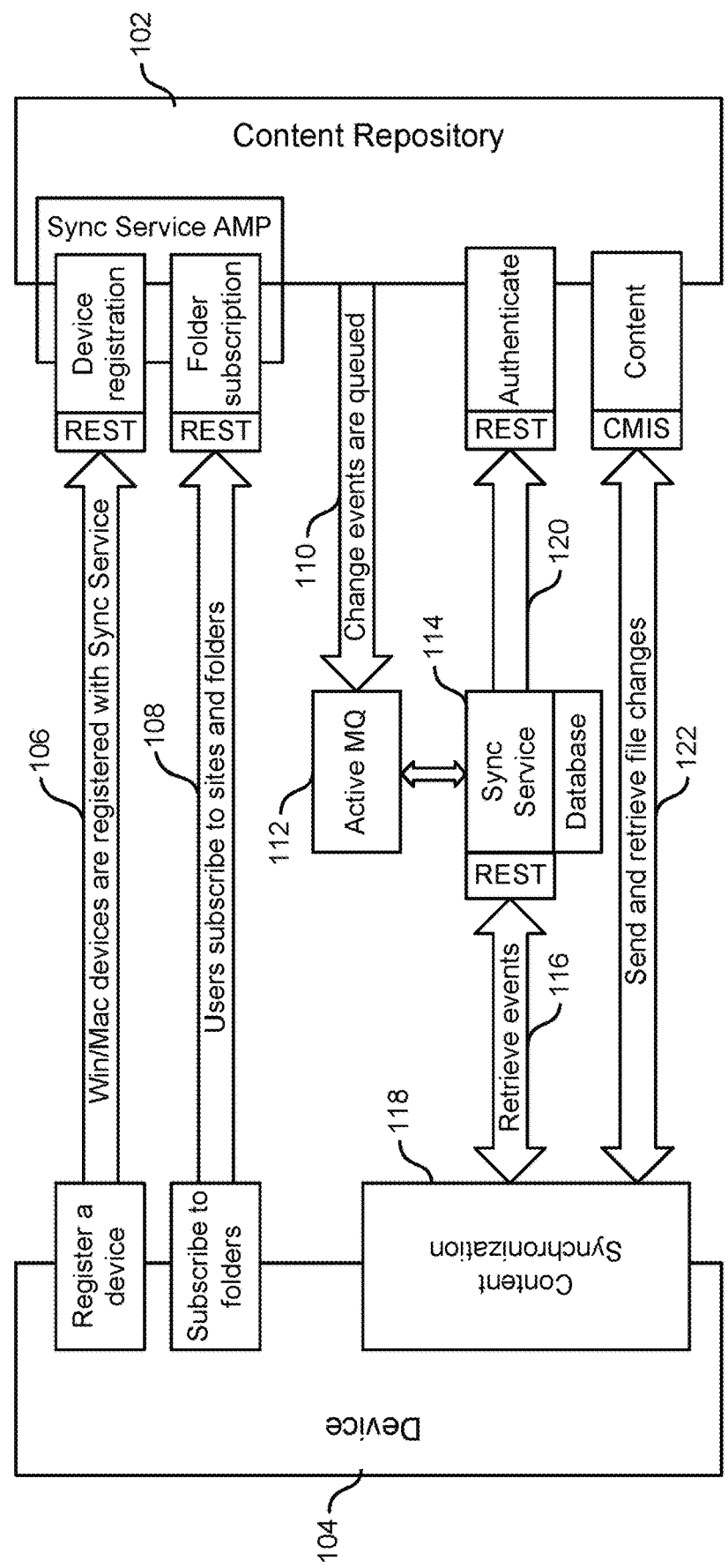
FIG. 1 illustrates a desktop synchronization process at a high level.

A system and method is described, which can be implemented as a native or downloadable desktop application. The system and method, as executed by a computer system, allows content to be treated appropriately when users have synchronized files from a centralized, controlled content management system to their desktops. The system and method provides content governance, record declaration, and classification capabilities from within the native operating systems of users' computers.

Check Out/in of Files

In order to collaborate on files stored in a content management system, users can "check out" one or more files, which locks the file out so that other users cannot edit a separate copy. Through integration into a client computer's operation system, such as Windows Explorer® and Mac Finder®, users can check files out for editing directly from their computer. Meanwhile, the checked-out files are automatically locked on the server to other users. Where a checked-out file is synchronized to another user's computer, it is put into a read-only state to prevent editing. Users receive notifications directly on their computer whenever a synchronized file is checked out or in by another user.

Permissions Synchronization

Organizations apply varying levels of user permissions to files and folders in a centralized content management system. Permissions can range from no access, to view-only, and up to full edit and delete. It is critical for organizational content to be managed in accordance with those permissions even when outside of the centralized system, which includes a content repository.

In accordance with the methods and systems described herein, users cannot: synchronize files or folders without view permission; edit synchronized files/folders without edit permissions; nor delete synchronized files/folders without delete permissions. In the system, clients replicate the permissions set in the centralized content management system on the synchronized files by utilizing the computers' operating systems' (Windows or Mac OS X) Access Control Lists (ACLs) APIs. The files are monitored, and attempts to override are automatically reversed, even when the user has administrator control of the computer. Where a users' permissions are changed in the centralized content management system, then the clients will receive an event for the specific changes, and update the files/folders on the users' machine in accordance with the changes made on the server.

The system provides efficiency, where the correct treatment of content that is to be a record or classified is critical to ensure legal requirements are adhered to. The process can be burdensome to end users and can be fraught with complexity where content is originated on users' computers. Integrating the desktop with the automation of an electronic content management system saves significant time and reduces the manual effort required.

Governance and Compliance: By taking records management and classification controls to where users are creating content, records managers and information/compliance officers are better able to control live content that users have on their computers.

User Adoption: User adoption of Records Management solutions (though this does not only apply to records but general content) is critical in a successful deployment. The ability to control files that are on users' desktops significantly increases the reach of these governance controls in organizations. The solution can be implemented into a government or commercial organization that generates and manages both permanent records and classified content.

Figure 2:
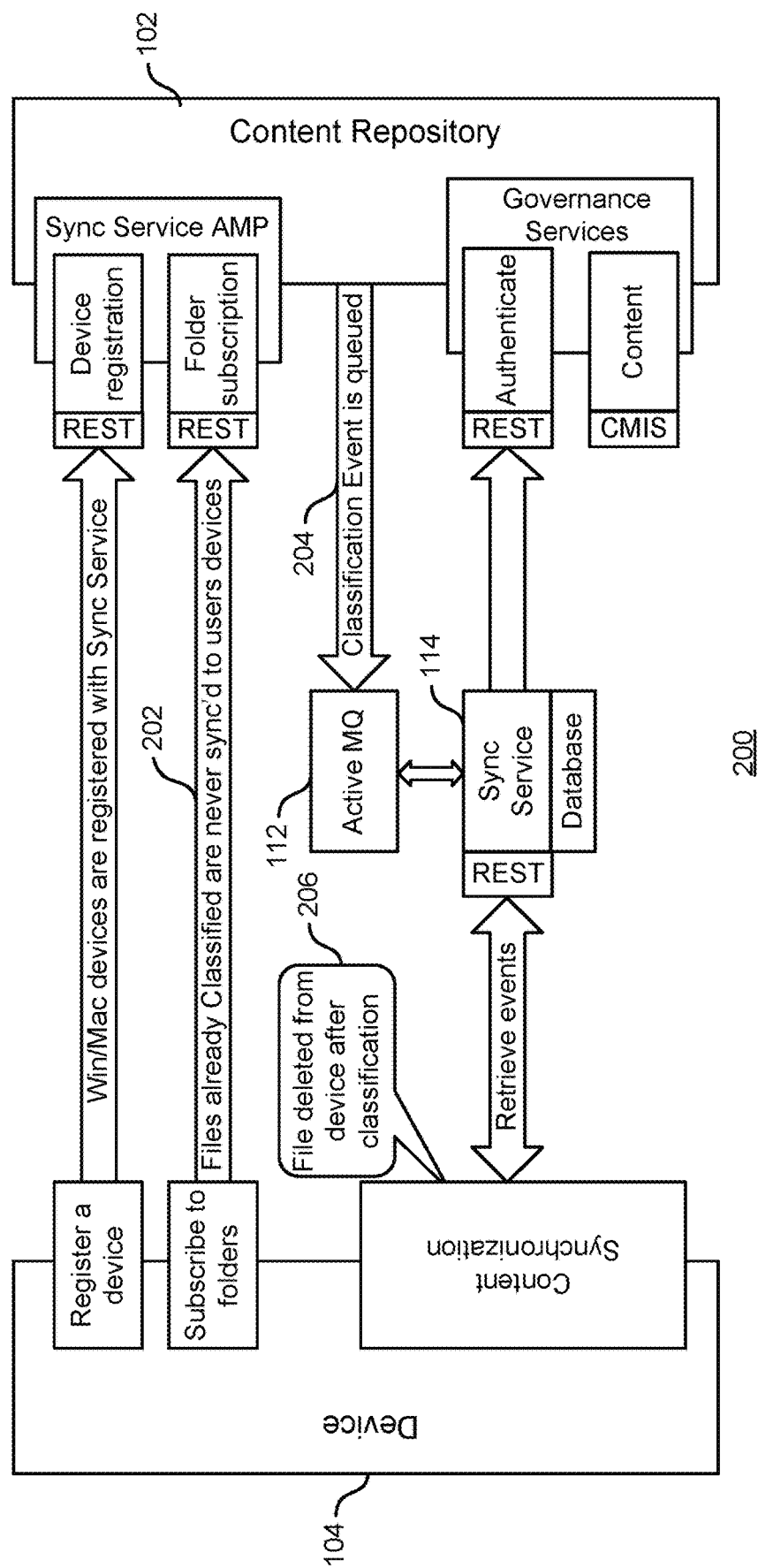
FIG. 2 illustrates the desktop synchronization process when files are classified.

FIGS. 1-3 illustrate a system executing a process for desktop synchronization, consistent with implementations of the current subject matter. FIG. 1 illustrates a desktop synchronization process, as substantially described in U.S. Patent Publication No. 2015/0278323, entitled "SYNCHRONIZATION OF CLIENT MACHINES WITH A CONTENT MANAGEMENT SYSTEM REPOSITORY," the contents of which are incorporated by reference herein for all purposes.

FIG. 1 illustrates the various stages and processes that occur during a normal content synchronization from a centralized content management system 102 (which includes a content repository) to a user's client computing system 104. The client computing system 104 can include a computing device, such as a desktop computer, laptop computer, tablet computer, mobile computing device, or the like, and which includes client software applications configured for creating, editing, managing records. After installing the client software, the user's computing device is registered with the system, at 106. Following the computing device registration, the user can select which folders are to be synchronized to their computing device, at 108.

As shown in FIG. 1, at 110 all content events (create, update, delete, rename etc.) are generated by the centralized content management system, placed into a queue 112 and processed by a synchronization service 114. At 116, the end-user client computing system retrieves events relevant to their subscribed content, the events contain necessary information so that the client computing system can perform a synchronize operation 118 (download, rename, delete, etc.). In the case that a local change to content is made on the users' computer, then the application makes appropriate changes to the server directly, at 120. File changes can be sent and retrieved between the content management system 102 and the client computing system 104, at 122.

FIG. 2 illustrates a desktop synchronization process 200 when files are classified, in accordance with implementations described herein. Arrow 202 shows that pre-existing classified files are not synchronized to users' computing devices, and arrow 204 shows that when an event is generated after a file is classified, that event is queued for retrieval by any users who are synchronizing the content. At step 206, the file is deleted from the client computing system 104.

In yet other implementations, the desktop synchronization process 200 can allow different treatment of classified files based on a classification applied to a specific file. For instance, a file classified as "SECRET" can be synchronized between a server system and selected ones of the client computing systems 104 or devices, while a file classified as "TOP SECRET" can be deleted from the client computing systems 104. Accordingly, where different classifications of files are used, the system and method provided herein can provide different corresponding treatment and handling of those files, and based on a particular classification.

FIG. 3 illustrates a desktop synchronization process 300 when files are declared as records. Arrow 302 shows that when an event is generated after a file is declared, an event is queued for retrieval by any users of client computing systems 104 who are synchronizing the content. As a result, the file is made read-only, and cannot be changed. Arrow 304 indicates that the desktop synchronization client can also trigger the record declaration directly on the server 102, after which a declared record event is generated for other users who may be synchronizing the file, at 306.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track p ad s, voice recognition hardware and software, optical scanners, optical pointers, digital image capture devices and associated interpretation software, and the like.

In the descriptions above and in the claims, phrases such as "at least one of or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    removing a first item from a client computing system, in response to detecting the first item is declared as belonging to a first class in a database;
    preventing editing of a second item by the client computing system, in response to detecting the second item is declared as belonging to a second class in the database,
        a record declared as belonging to the first class or the second class by an application executed on the client computing system,
        the client computing system remotely connected, via a communications network, to a content management system associated with the database; and
    queuing a third item for transfer to the client computing system over the communications network, in response to detecting a synchronization event initiated by the client computing system or a server computing system connected to the client computing system over the communications network.

2. The method of claim 1, wherein the first item is managed by the record management system according to a first policy, in response to being declared as belonging to the first class.

3. The method of claim 2, wherein the second item is managed by the record management system according to a second policy, in response to being declared as belonging to the second class.

4. The method of claim 3, wherein the first policy is different than the second policy and the first class is associated with a classified status and the second class is associated with a permanent status.

5. The method of claim 1, wherein initiation of the synchronization event by a user is prevented, in response to determining that the user has no view permission for the third item.

6. The method of claim 1, wherein the editing of the second item by a user is prevented, in response to determining that the user has no edit permission for the second item.

7. The method of claim 1, wherein removing the first item by a user is prevented, in response to determining that the user has no delete permission for the first item.

8. The method of claim 1, wherein the client computing system replicates a permissions set in the content management system for the first item, the second item, and the third item, in response to detecting the synchronization event using one or more access control lists (ALSs) in association with one or more application programing interfaces (APIs).

9. The method of claim 8, wherein the first item, the second item, and the third item are monitored and attempts to override the permissions set in the content management system are prevented, including when a user has administrator control of the client computing system.

10. The method of claim 9, wherein the permissions set for the user are changed in the content management system.

11. A computer-implemented system comprising one or more processors configured to perform a plurality of computing operations comprising:
  removing a first item from a client computing system, in response to detecting the first item is declared as belonging to a first class in a database,
  preventing editing of a second item by the client computing system, in response to detecting the second item is declared as belonging to a second class in the database;
    a record declared as belonging to the first class or the second class by an application executed on the client computing system,
    the client computing system remotely connected, via a communications network, to a content management system associated with the database; and
  queuing a third item for transfer to the client computing system over the communications network, in response to detecting a synchronization event initiated by the client computing system or a server computing system connected to the client computing system over the communications network.

12. The system of claim 11, wherein the first item is managed by the record management system according to a first policy, in response to being declared as belonging to the first class, and the second item is managed by the record management system according to a second policy, in response to being declared as belonging to the second class.

13. The system of claim 12, wherein the first policy is different than the second policy and the first class is associated with a classified status and the second class is associated with a permanent status.

14. The system of claim 11, wherein the client computing system replicates a permissions set in the content management system for the first item, the second item, and the third item, in response to detecting the synchronization event using one or more access control lists (ALSs) in association with one or more application programing interfaces (APIs).

15. The system of claim 14, wherein the first item, the second item, and the third item are monitored and attempts to override the permissions set in the content management system are prevented, including when a user has administrator control of the client computing system.

16. The system of claim 15, wherein the permissions set for the user are changed in the content management system.

17. A non-transitory data storage medium including logic code which when processed by a controller causes the controller to perform operations comprising:
  removing a first item from a client computing system, in response to detecting the first item is declared as belonging to a first class in a database;
  preventing editing of a second item by the client computing system, in response to detecting the second item is declared as belonging to a second class in the database,
    a record declared as belonging to the first class or the second class by an application executed on the client computing system,
    the client computing system remotely connected, via a communications network, to a content management system associated with the database; and
  queuing a third item for transfer to the client computing system over the communications network, in response to detecting a synchronization event initiated by the client computing system or a server computing system connected to the client computing system over the communications network.

18. The non-transitory data storage medium of claim 17, wherein the first item is managed by the record management system according to a first policy, in response to being declared as belonging to the first class, and the second item is managed by the record management system according to a second policy, in response to being declared as belonging to the second class, the first class is associated with a classified status and the second class is associated with a permanent status.

19. The non-transitory data storage medium of claim 17, wherein the client computing system replicates a permissions set in the content management system for the first item, the second item, and the third item, in response to detecting the synchronization event using one or more access control lists (ALSs) in association with one or more application programing interfaces (APIs).

20. The non-transitory data storage medium of claim 19, wherein the first item, the second item, and the third item are monitored and attempts to override the permissions set in the content management system are prevented, including when a user has administrator control of the client computing system.

* * * * *